United States Patent [19]

Kahan

[11] Patent Number: 4,671,624
[45] Date of Patent: Jun. 9, 1987

[54] VARIABLE LENS AND BIREFRINGENCE COMPENSATOR FOR CONTINUOUS OPERATION

[75] Inventor: Osher Kahan, Culver City, Calif.

[73] Assignee: Hughes Aircraft Company, Los Angeles, Calif.

[21] Appl. No.: 715,710

[22] Filed: Mar. 25, 1985

[51] Int. Cl.$^4$ .............................. G02F 1/00; G02F 1/29
[52] U.S. Cl. ................................................... 350/405
[58] Field of Search ............. 350/253, 351, 405, 353; 372/33–34, 97, 101, 105, 31, 98

[56] References Cited

U.S. PATENT DOCUMENTS

| | | | |
|---|---|---|---|
| 3,144,617 | 8/1964 | Kogelnik et al. | 372/103 |
| 3,442,574 | 5/1969 | Marcatili et al. | 350/179 |
| 3,609,584 | 9/1971 | Stitch et al. | 372/105 |
| 3,662,281 | 5/1972 | Koechner | 372/105 |
| 3,675,152 | 7/1972 | Young | 372/33 |
| 3,704,935 | 12/1972 | Boer | 350/160 |
| 3,736,046 | 5/1973 | Zook | 350/379 |
| 3,780,296 | 12/1973 | Waksberg et al. | 250/201 |
| 3,790,250 | 2/1974 | Mitchell et al. | 350/353 |
| 3,838,906 | 10/1974 | Kumada | 350/388 |
| 3,892,469 | 7/1975 | Lotspeich | 350/379 |
| 3,913,033 | 10/1975 | Tuccio et al. | 372/36 |
| 3,945,715 | 3/1976 | Drake | 350/389 |
| 4,019,159 | 4/1977 | Hon et al. | 332/7.51 |
| 4,035,081 | 7/1977 | Sepp et al. | 372/34 |
| 4,117,399 | 9/1978 | Ono et al. | 324/96 |
| 4,124,273 | 11/1978 | Huignard et al. | 350/379 |
| 4,169,661 | 10/1979 | Yamada et al. | 350/353 |
| 4,233,567 | 11/1980 | Chernoch | 372/33 |
| 4,387,462 | 6/1983 | Markus | 372/33 |

FOREIGN PATENT DOCUMENTS

| | | | |
|---|---|---|---|
| 7533563 | 12/1975 | France . | |
| 1448676 | 9/1976 | United Kingdom | 372/34 |

Primary Examiner—William H. Punter
Attorney, Agent, or Firm—Ronald L. Taylor; A. W. Karambelas

[57] ABSTRACT

Apparatus and method are disclosed for providing an improved variable lens and birefringence compensator envisioned for use within the resonator cavity of a laser which is capable of continuous operation. A pair of cylindrical bodies of optical material (12A, B) having a temperature dependent index of refraction are thermally coupled to heat exchange means (14A, B) surrounded by potting material (16) which adds heat to or extracts heat from the exterior surfaces of the cylindrical bodies in order to establish radially dependent thermal and stress gradients within the bodies. The heat exchange means (14A, B) is supplied power through leads (20A, B) and infuses or removes heat in order to establish a thermal gradient which is used to create a dynamic lens of opposite power to that of the laser rod which corrects beam divergence in the lased output. The stress gradient causes the compensator body to behave like a birefringent substance. The double refracting behavior of the compensator effectively reconstructs the laser beam passing through it which was depolarized by the birefringent action of the laser rod itself. The tandem arrangement (48) of variable lens and birefringence compensators is coordinated by temperature sensor and trigger means (66, 68) which sense the temperature of the compensators (50, 52) through thermocouples (60, 61) and which are coupled to heat exchange means (14A, B) via control means (70, 72) and leads (20A, 20B). The control means (70, 72) prevent the compensators from overheating and enable the lensing and compensating action to be maintained without interruption.

20 Claims, 19 Drawing Figures

VARIABLE LENS AND BIREFRINGENCE COMPENSATOR FOR CONTINUOUS OPERATION

CROSS REFERENCE TO A RELATED APPLICATION

This application is related to a copending U.S. patent application entitled "Variable Lens and Birefringence Compensator" (Ser. No. 677,452; filed Dec. 3, 1984) by Osher Kahan, the sole inventor of the present application, and Eduard Gregor. The specification of patent application Ser. No. 677,452 on Dec. 3, 1984 is hereby incorporated herein by reference.

BACKGROUND OF THE INVENTION

1. Field of the Invention

The present invention relates to lasers and optical compensation of laser radiation. More specifically, this invention is concerned with means and methods for creating temperature gradients within a plurality of bodies of optical material for establishing radially dependent optical path length and polarization fields which can be exploited to continuously compensate for anomalies in laser rods.

2. Background Information

Figure 3A:
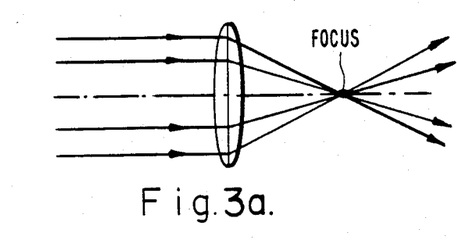
FIGS. 3a, b, and 3c–3g are illustrative explanations of the action of a positive lens, a negative lens, and the property of birefringence respectively.

One of the most burdensome problems which confronts designers of communication and measuring systems which employ lasers is the phenomenon of beam divergence. Although lasers produce coherent light which is commonly preceived to be constituted of a multitude of perfectly parallel rays of electromagnetic radiation, these rays always spread to some extent. Excessive divergence of the beam occurs if the optical components comprising the resonator cause optical distortions. Various laser amplification media and systemic constraints cause distortion in laser rods. Typical repetitively pumped solid state laser rods, for example, tend to produce output radiation which diverges in proportion to the pumping power of the laser. An optical device which causes radiation to diverge exhibits the most significant property of a convex or positive lens, as depicted in FIG. 3a.

If an incident beam of light composed of collimated or parallel rays is directed toward a positive lens of uniform and isotropic temperature and is aligned parallel to the optical axis of the lens, then the direction of each ray that issues from the exit side of the lens will depend upon the angle of its incidence relative to the surface normal on the face of the lens and upon the optical path length which the ray must traverse in order to travel across the lens. Each ray will be bent by an amount which is dependent upon its angle of incidence relative to the surface normal and its path length which, in turn, depends upon the index of refraction of the optical material from which the lens is made and the thickness of the lens which the ray traverses.

In the case of a repetitively pumped laser rod, the rod will be heated by an amount proportional to the input power the rod absorbs from the excitation mechanism. The heat in the rod is dissipated at its exterior surface. Gradually, perhaps over a period of ten seconds, the rod is transformed into a positive lens by this heating and cooling. This transformation takes place because the rod is not uniformly and isotropically homogeneous with respect to temperature. The temperature differences along any radius of the rod set up regions of different indices of refraction. A radial temperature gradient is created within the rod, and, since the refractive index is temperature dependent, a radial refractive index gradient is also established within the rod. This effectively creates a lens having a distribution of radially dependent optical path lengths which mimics that of a physically convex lens which is depicted in FIG. 3a. The power of this transitory positive lens is proportional to the extent to which it is heated because the temperature determines the spatial variation of refraction within it. The temperature gradient generated in the rod is proportional to the heat flow and the refractive index parallels the temperature gradient. This dynamic lensing action of the rod, brought about by a temperature gradient, is responsible for the unwanted beam divergence.

When the output beam of a laser diverges in this way, the coherent radiation loses much of its effectiveness, since the energy delivered by the beam to a distant point depends on how much of the beam is concentrated on a targeted spot of limited area. Energy which is spread out over a much larger area than the cross-section of the original beam is less concentrated, and therefore less useful, in communications and measurement applications.

Various complex mechanical systems have been employed in previous attempts to solve this problem of rod lensing. One such system is a zoom lens which consists of a pair of short focal length lenses of opposite optical power. The spacing between the lenses can be adjusted to control the net optical power resulting from the use of the pair of lenses. This arrangment maintains a constant beam divergence, but the exorbitant cost of the necessary precision lenses, mechanical races, direct current motor, and complicated control electronics makes this solution unattractive.

Simple static concave negative lenses have been used in the laser resonator cavity to compensate for the dynamic lensing action of the rod. The constant action of the static negative lens, however, proves detrimental to the operation of the laser until the time when the laser rod has been heated and has attained the exactly equivalent but opposite optical power for which the simple fixed negative lens is designed to compensate. A further complication results from the use of variable repetition rates of the pulsed laser. One static concave negative lens can not cope with variable rates, since the best achievable compensation is for one particular, specified magnitude or extent of dynamic lensing caused by the heated laser rod.

Another problem concerning the performance of a solid state laser is the optical aberration of laser rod due to thermal birefringence in the laser rod which causes depolarization of the laser beam and reduces efficiency in polarized lasers. When a solid state rod is pumped with excitation radiation, a great portion of this stimulation energy is converted to heat in the rod. One of the effects of this rod heating is the depolarization of the laser beam by birefringence. Beam depolarization can reduce the potency of laser output and therefore poses a serious problem when lasers are used in situations which require high power output.

In a solid state rod, heat resulting from flashlamp excitation causes physical deformation of the rod. Since the rod material expands with temperature, a radial stress gradient is formed which produces radially dependent birefringence in the rod. Birefringence, also known as double refraction, is an optical phenomenon in which a material exhibits a different index of refraction for each of two polarization directions defined by the material. This double refraction is illustrated by the action of a birefringent crystal in FIGS. 3c–3g. In the course of the passage of light through it, a birefringent medium resolves the polarized beam into two component beams. Each beam is polarized along one of the unique directions, so that the beams traverse the material at different speeds. When the two beams recombine after leaving the material, they are no longer in phase with one another and the polarization state is changed.

Figure 3B:
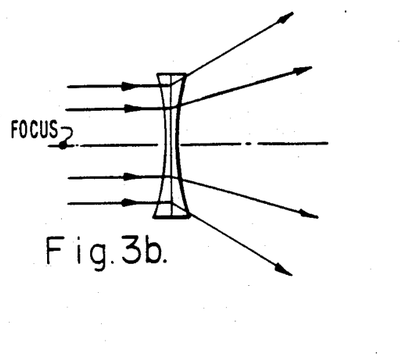
Figures 3C, 3D:
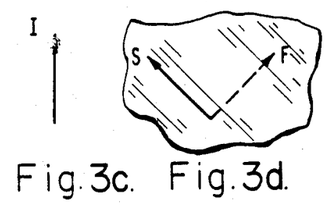
Figure 3E:
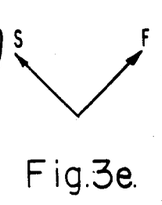
Figure 3F:
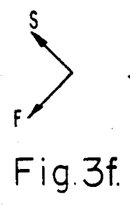
Figure 3G:
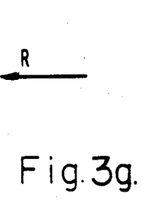

FIGS. 3c–g schematically illustrate this birefringence phenomenon. In FIG. 3c, vector I represents the polarization direction of a beam of incident light. When this beam I passes through a birefringent material, as is shown in cross-section in FIG. 3d, the vector I is resolved into two components, S, shown in solid line, and F, shown in dashed line. Components S and F, which represent high and low refractive index polarizations, respectively, are shown after exiting the crystal in FIG. 3e. The S component now lags the F component as a result of the birefringent action (FIG. 3f). When added vectorially, S and F combine to form the resultant vector R which has a new polarization direction (as shown in FIG. 3g).

The heat in the laser rod creates depolarizing regions within it which vary in efficacy in accordance with each internal region's distance from the central axis of the rod. The different regions cause the rod as a whole to become birefringent because of variations in the indices of refraction of the differently stressed portions of the rod. As was the case with the limitations of compensation of beam divergence by the action of a single, simple negative lens placed within the resonator cavity, such a lone optical element is equally ineffective in correcting for depolarization caused by laser rod thermal stress birefringence.

Previously known methods of compensating for rod birefringence include the use of a polarization rotator used between a pair of rods operated at the same output power level. A lensing system is employed to align the beam so that the rods compensate for each other's birefringence. This system, however, requires the use of two rods in addition to pressure vessels which are extremely expensive and difficult to maintain in proper mechanical alignment.

A number of inventions noted in the disclosure statement filed in connection with this application employ devices which modify a beam of radiation using an externally controlled optical medium in order to alter various properties of the beam. U.S. Pat. No. 3,736,046—Zook, discloses apparatus which adjusts the wavefront shape of a light beam using beam-addressed optical memory means controlled by a varying electric field. Mitchell et al. describe an optical device which exhibits temperature-dependent optical absorption properties in U.S. Pat. No. 3,790,250. An apparatus devised by Drake in U.S. Pat. No. 3,945,715 employs an electro-optical transducer in a large scale data storage system. Hon et al. (U.S. Pat. No. 4,019,159) use a feedback arrangement with a crystal of electro-optic material mounted in an oven to control the temperature and tune the electric field of a frequency doubling crystal. In U.S. Pat. No. 4,117,399, Ono et al. explain a method and apparatus for measuring electric current or voltage which utilizes an optical converter which includes a source of laser light, a polarizer, and a Faraday rotator. Huignard et al. exploit the Kerr Effect by subjecting two astigmatic electro-optical elements to varying electric fields in U.S. Pat. No. 4,124,273 in order to focus an incident beam of energy on an object which is changing its position rapidly. A thermal-optical converter comprising a closed vessel containing an aqueous solution is disclosed by Yamada, et al., in U.S. Pat. No. 4,169,661.

None of the preceding inventions solves the problem of the deleterious effects of beam divergence or depolarization produced by thermally induced birefringence in a solid state rod laser. Three of the inventions cited in the disclosure statement are more directly concerned with the problem of using an externally controlled optical medium to accomplish some compensation of aberrations in a beam of radiation. Kumada discloses apparatus comprising an electro-optical crystal used in conjunction with a power source which is used to impose a voltage that regulates the transmission of incident light through the crystal. This optical switch, which is described in U.S. Pat. No. 3,838,906, restricts light transmission by altering the birefringent characteristics of the crystal. Kumada's invention is not directed to the problem of mitigating beam divergence or correcting unwanted depolarization in coherent light output. In U.S. Pat. No. 3,780,296, Waksberg et al. disclose apparatus for an electro-optical laser beam modulation system. This device requires a specially birefringent optical medium and employs analyzer and photodetector means for generating and processing an error signal in order to modify the characteristics of a laser beam. This device not only requires a medium which must exhibit particular birefringent behavior, but also necessitates the inclusion of complex electronic control and analysis equipment. U.S. Pat. No. 3,892,469—Lotspeich reveals an apparatus which employs an array of cylindrical electrodes which are embedded in a solid body of crystalline material and are energized by a remote power supply in order to provide a device having a variable focal length. Lotspeich's device requires the precise and costly implantation of metal electrodes in a specialized compensation medium. Additionally, Lotspeich makes no attempt to confront the difficulties imposed by stress-related depolarization of the beam.

None of these prior devices provides an effective and inexpensive solution to the optical aberrations described above in detail which plague the operation and performance of high-output solid-state lasers. Such a solution would satisfy a long felt need manifested by the current efforts of the laser and optics industry, which continues to develop communications and measurement systems which require reliable, durable, and cost-effective high output lasers. The continued development and manufacture of such high power lasers has generated a concomitant demand for an invention which compensates for laser beam imperfections in a manner which does not create additional deleterious side-effects and which does not interfere with the performance and amplification of the laser itself.

Such a compensator would ideally be suited to operate inside a laser resonator and would be required to function effectively over a wide range of temperatures which would include operational ranges for military as well as commercial applications.

SUMMARY OF THE INVENTION

The present invention provides an efficacious, practical, cost-effective, and straightforward solution to the problems of beam divergence and birefringent depolarization. The present invention utilizes a pair of compensators comprised of two bodies of optical material which are thermally coupled to a pair of heat transfer means for establishing adjustable radial temperature gradients within the compensators. The compensator bodies are designed to reside within a laser resonator on either side of the laser rod without adversely affecting the laser tuning, although the invention could be adapted to operate outside of the laser cavity without a loss of performance. Heat is added to or extracted from the periphery of the compensator bodies in exact proportion to the extent of the heating of the laser rods.

The addition or extraction of heat from the compensator bodies establishes radial thermal gradients within them which are opposite to the gradients in the laser rod. In each of the laser rods, heat is dissipated at its periphery. In the compensators, heat is added at the periphery of the compensators. By selecting a material for the compensator bodies which has a temperature dependent index of refraction, the spatial variation of temperature within a body can be exploited to create a dynamic lens. By further selecting a material which develops a higher index of refraction when its temperature is increased, each compensator can be made to behave like a negative lens such as illustrated in FIG. 3b, when the heat transfer means is activated and raises the temperature of a compensator body. By placing such a tandem compensator in proper alignment with the divergent output of a solid state laser rod, beam divergence can be reduced since the positive aspect of the laser rod will be canceled by the exactly opposite negative power of the dynamic lens formed by the tandem compensator. Furthermore, depolarization caused by laser rod birefringence can be similarly remedied since the thermal gradient within the dynamic lens is deliberately imposed to be in the opposite sense of the gradient within one of the laser rods. By selecting optical material which possesses a particular refractive index dependence upon temperature, this single device can simply and inexpensively extinguish a substantial portion of both sources of optical imperfection concurrently.

The present invention further solves the dilemma which results from the use of a single simple negative lens within the resonator cavity. The action of the twin compensators is always directly proportional and opposite to that of the stimulated laser rod. The pair of compensators is initially optically neutral. The optical power it subsequently assumes is automatically tailored to the laser rod. The lensing phenomenon produced by the present invention will always be precisely suited to accomplish a correction of whatever divergence or birefringence aberrations which would otherwise distort the laser output.

One of the limitations of the invention disclosed in the related application entitled "Variable Lens and Birefringence Compensator" by Osher Kahan and Eduard Gregor is that the lensing and compensation action which that invention provides is not continuous. That apparatus employs only one body of optical material which is susceptible to overheating after some finite period of operation. After the temperature limits of that system are reached, the power which is supplied to the heat exchange means must be turned off in order to allow the optical material to cool.

A system which provides uninterrupted correction of beam divergence and birefringent depolarization would be highly advantageous, since there are a myriad of applications which would benefit from the continuous action of this innovative and important device.

One of the most important features of the present invention is that it utilizes a plurality of coordinated variable lens and birefringence compensation means to provide for uninterrupted operation. This extremely valuable feature constitutes a major step forward in the laser technology art since it is critically important in utilizing the present invention with the vast number of possible advantageous applications which call for a continuous, as opposed to an intermittently operated laser.

Another of the most important features of the present invention is that it utilizes dual polar heat removal means deployed at each of the two poles of each of the coordinated variable lens and birefringence compensation means. This beneficial innovation further enhances the reliability, durability, and useful lifetime of the apparatus. In addition, the incorporation of the dual polar longitudinal heat removal means refines and implements the features of the original preferred embodiment of the invention described in the previous patent application by O. Kahan and E. Gregor and thereby makes the continuous operation capability described above practical so that the invention can be produced commercially for use over in wide range of laser environments.

One of the features of the present invention is the provision for heat removal means which extracts heat generated by the operation of the twin rod compensators. Heat is removed from the polar regions of the rods of optical material of each of the coordinated lens assemblies. This polar heat extraction creates longitudinal temperature gradients which do not alter the lens properties of the compensators.

It is, therefore, an object of the present invention to provide an effective, continuous means of correcting the problem of beam thermally induced excess divergence in laser rods.

Another object of the present invention is to incorporate a plurality of coordinated variable lens and birefringence compensation means in addition to dual polar heat removal means to provide for practical, uninterrupted operation.

It is a further object of the present invention to provide an effective means of correcting the problem of thermally induced excess beam divergence in solid state rod lasers.

It is a further object of the invention to correct unwanted depolarization of laser beams caused by laser rod birefringence.

It is a further object of the invention to effectively diminish the above described optical aberrations in an inexpensive and reliable manner which employs a minimum of parts. Such avoidance of moving parts eliminates the constant calibration and eventual replacement of components which are susceptible to wear by friction.

Another object of the invention is to provide a compensator which is sufficiently versatile so that it will function when deployed on either side of the laser rod or even immediately outside the resonator.

An appreciation of other aims and objects along with a more complete and comprehensive understanding of the present invention may be achieved through the study of the following description of a preferred embodiment in addition to reference to the accompanying drawings.

DESCRIPTION OF A PREFERRED EMBODIMENT

Figure 1:
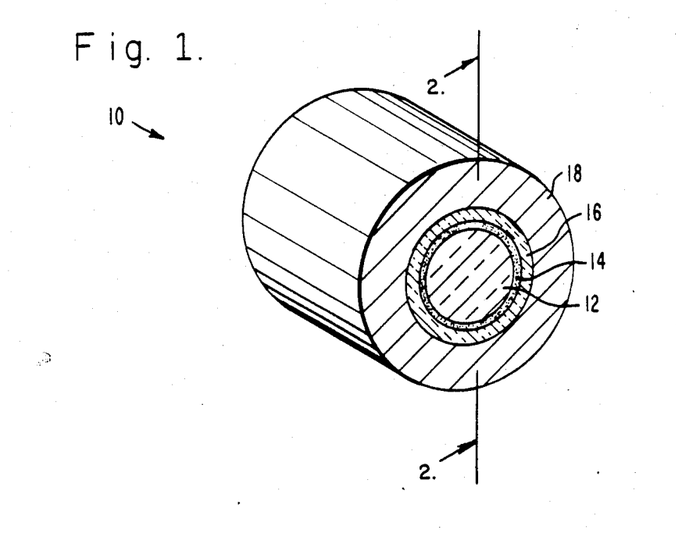
FIG. 1 is a perspective view of a portion of the present invention which also reveals its cross-sectional structure.
Figure 2:
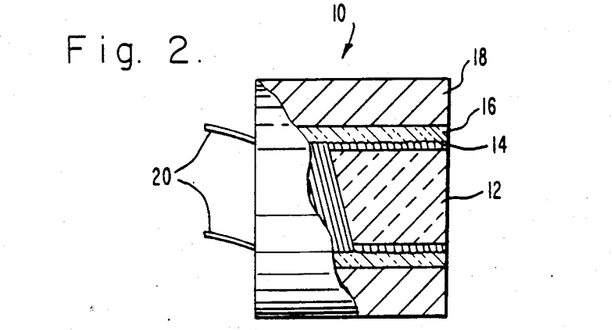
FIG. 2 is an elevational, partial cutaway view of a portion of the invention taken along line 2—2 of FIG. 1.

FIGS. 1 and 2 depict a portion of the present invention which comprises the essence of the single rod invention disclosed in copending patent application Ser. No. 677,452 as noted above. A single-rod variable lens and birefringence compensator 10 includes one cylindrical body 12 of optical material surrounded by one heat exchange means 14 consisting of a coil of thin insulated wire which is wound around the full extent of body 12. The heat exchange means 14 is, in turn, enveloped by a layer of potting material 16 which has the property of being a poor thermal conductor. This insulating layer is disposed between a body 12 of optical material and a heat sink 18 which is employed to dissipate excess heat which builds up in body 12.

In FIG. 2, leads 20 are shown extending to the ends of the coiled wire of the heat exchange means. Compensation body 12 may be chosen to be cylindrical or disc-shaped. Any generally elongated rodlike configuration may be employed which would enable the designer to impose some predetermined temperature gradient in order to exploit or alter the optical properties of the single-rod compensator. A rodlike structure having an elliptical cross-section, for example, might be utilized to accomplish some task of optical correction if the circumstances required such a variation on the central innovative concept which comprises this invention. The length of the single-rod compensation body affects the maximum operation interval of a single-rod compensator. After a certain period of operation, excess heat builds up in a single-rod compensator and adversely affects its correcting power because eventually the heat transfer means and body of optical material reach thermal equilibrium. In a cylindrical rod, for example, a single one-half inch (1.25 cm) long rod can provide compensation for roughly one and one-half minutes. A single two inch (5 cm) long rod has a maximum operation interval of about eight minutes, at which time the sole compensator must be allowed to cool before it can be used again with the desired results. A relatively longer compensator body, however, requires less heat input per unit volume to achieve the same level of correction. The optical material must exhibit the property of a temperature dependent index of refraction in order to be effective in curing the defect of thermally induced beam divergence. Similarly, if a compensator is envisioned to be used as a birefringence corrector, the optical material must expand when its temperature is elevated in order to form the appropriate stress field which remedies depolarization. These two characteristics are physically independent since a compensator need not necessarily be employed to assuage both the divergence and depolarization conditions. A material may, however, be selected which accomplishes both tasks simultaneously. Given these constraints, the designer of a compensator is at liberty to use a broad array of substances for the body of the compensator. Aside from the most likely choices of glass, plastic, or crystal, any material which displays the attributes delineated above may be selected for the task. Even a liquid or gaseous-phase compensation medium may be employed if it satisfies the design criteria explained above.

In designing a single-rod compensator body, an important criterion to consider is the thermal conductivity of the optical material selected. A minimum heat input by the heat exchange means will maximize the operation interval before such a single rod compensator must be deactivated and allowed to cool. In order to minimize the amount of heat admitted to a compensator body, it is highly desirable to select a material in which a small change in temperature will produce a large change in the temperature gradient created in the compensator. Material which has a low thermal conductivity or diffusivity prevents the infused heat from migrating to the center of a compensator body too rapidly.

The heat exchange means may be fashioned out of a coil of thin, insulated wire commonly used in transformers or inductor coils. Such wire can be wound around a compensator body and spaced in any arrangement which will supply the desired degree of heat exchange. An alternative embodiment of the heat transfer mechanism would consist of a layer of resistive material deposited directly upon a compensator body. Such an enclosure or covering would be coupled to electrodes at its ends in order to pass an electrical current through it. Such material may generate heat when an electrical current is passed through it or may cool when energized, such as Peltier junction material. A further variation upon the inventive concept of the heat transfer means could be to use an external source of radiation, acoustic vibration, or heat exchange via an ambient medium of different temperature to accomplish the same goal of imposing an adjustable, substantially radial thermal gradient across and throughout a compensator body.

The single-compensator embodiment of the invention is constructed using a commonly available disc of optical material known commercially as a BK-7. This disc is approximately 0.4 inches (1 cm) in diameter and extends about 0.3 inches (0.8 cm) from end to end. The BK-7 disc is wrapped with a standard version of insulated transformer wire. Electric current passed through the wire to heat the periphery of the disc imposes a quadratic temperature distribution within the disc which effectively forms a spherical lens having optical power proportional to the amount of heat dissipated at its exterior. The heat diffuses inwards gradually as the periphery of the lens continues to increase in temperature. Once the body of optical material reaches thermal equilibrium with the heat transfer means, the single-rod compensator is rendered ineffective and must be deactivated and allowed to cool. The BK-7, for example, sustains a constant optical power level for approximately 1.25 minutes for a constant level of input power. Increasing the input power as the optical power begins to taper off can extend the operation period, but the greater the input heat that is used per unit volume of compensation body, the shorter the duration of the lensing action since thermal equilibrium is attained more quickly.

The invention may be tested using a Zygo interferometer. The lens formed behaves like a spherical lens free of wedge. Experimental testing which employs a laser rod and a compensator placed between crossed polarizers yields results which indicate that the compensator reduces depolarization substantially.

Figure 4:
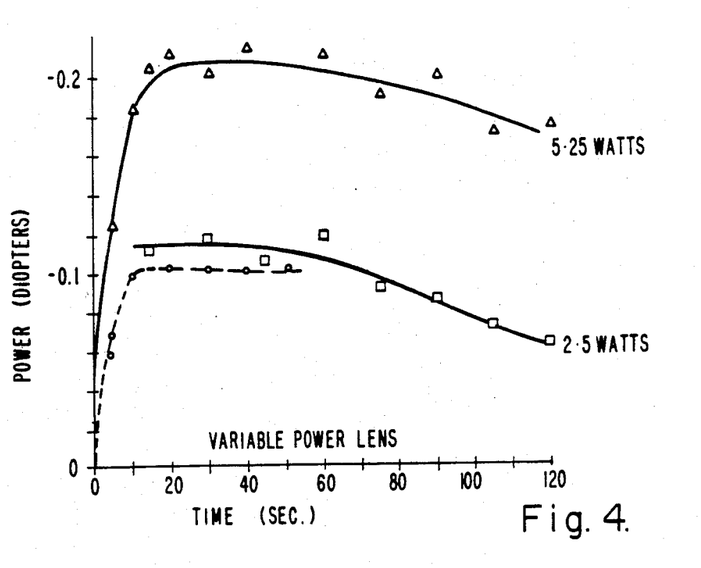
FIG. 4 is a linear plot of the optical power of the dynamic lens as a function of operation time.
Figure 5:
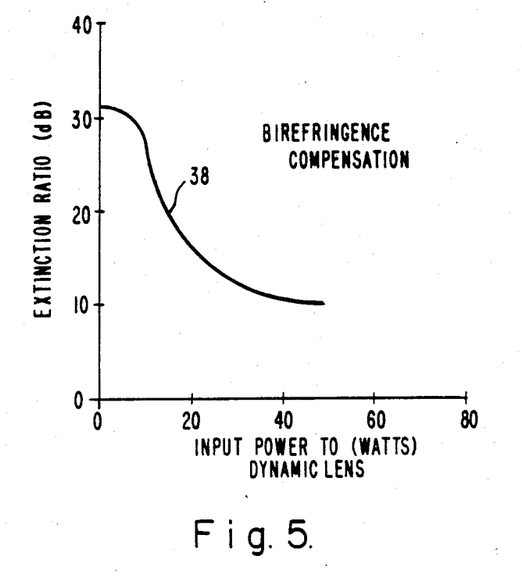
FIG. 5 is a graph showing the effectiveness of the present invention as a compensator of birefringent depolarization.

Actual experimental data attesting to the effectiveness of the invention is presented in FIG. 4. Lens power in diopters is represented as a function of operating time of the compensator in seconds. FIG. 5 is a graph 38 illustrating the efficacy of the compensator in its birefringent depolarization correction mode. Graph 38 shows the degree of birefringent behavior exhibited by the compensator for a given input power in watts. The extinction ratio measured on the ordinate is a quantity measured in dB which indicates the degree of diminution of intensity of radiation which is initially linearly polarized in a given direction, passed through a depolarizer, and then measured by a device which is sensitive only to components which are perpendicular to the initial polarization direction.

Figure 6:
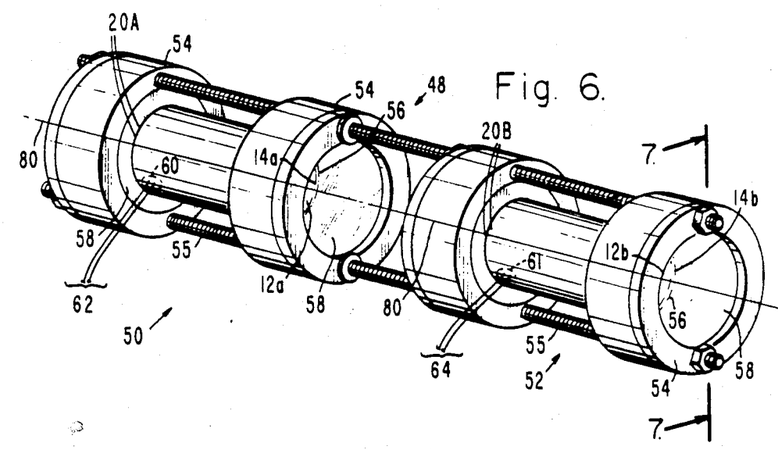
FIG. 6 is a perspective side view of the present invention depicting two aligned variable lens and birefringence assemblies incorporating dual polar longitudinal heat removal means which provide for coordinated, continuous operation.

FIG. 6 depicts a tandem coaxial arrangement 48 of identical variable lens and birefringence compensators which, for purposes of illustration, have been labelled 50 and 52 in FIG. 6. Assemblies 50 and 52 are mechanically joined by connector bolts 55. Both bodies of optical material 12 are rod-shaped and are in optical alignment, i.e., are coaxial with longitudinal axis 80. Each of the twin assemblies 50 and 52 comprises a rod 12A, 12B surrounded by a heat exchange means 14A, 14B consisting of a coil of thin insulated wire. As described above, heat exhange means 14A, 14B may also comprise a sleeve or deposit of resistive material connected to leads 20A, 20B at both ends. Peltier junction material, which cools when an electrical current passes through it, may also be employed. Heat exchange means 14A, 14B is enclosed within a layer of potting material 16 which is a poor conductor of heat. The potting material 16 covers only the cylindrical surface of each rod 12A, 12B; as opposed to either of each rod's circular end surfaces. This selective deployment of thermal insulation blocks the radiation of heat away from each rod 12A, 12B in radial directions and forces heat to migrate to the circular end surfaces of each rod.

Each assembly 50 and 52 includes a pair of annular aluminum heat sinks 54 which are joined by heat sink connector bolts 55. Each aluminum heat sink 54 encircles a disc 58 of optically transparent aluminum oxide, which is commonly called sapphire. A good heat conducting boundary between the outer surface of each sapphire disc 58 and its respective adjoining inner wall of aluminum heat sink 54 is formed by spring-loading each aluminum ring. A small cut (not shown) is made through each ring which enables each ring of aluminum 54, which has a slightly smaller interior diameter than the diameter of the sapphire discs 58, to be spread apart and fitted tightly over a disc 58. Aluminum is employed in the preferred embodiment of the invention because it is a very good conductor of heat and is relatively lightweight and inexpensive. Other materials that are well suited for use as heat sink material may be utilized as well. The heat sink may also be fashioned as a solid, continuous sleeve of material which encloses each entire variable lens and birefringence compensator 50, 52. Although FIG. 6 shows heat sinks 54 having smooth outer surfaces, the heat transferring capacity of these aluminum rings may be enhanced by increasing their surface area. The heat sinks can be formed with radial fins (not shown), so that larger amounts of heat can be exchanged from the heated rod 12A, 12B to the ambient environment.

Figure 7:
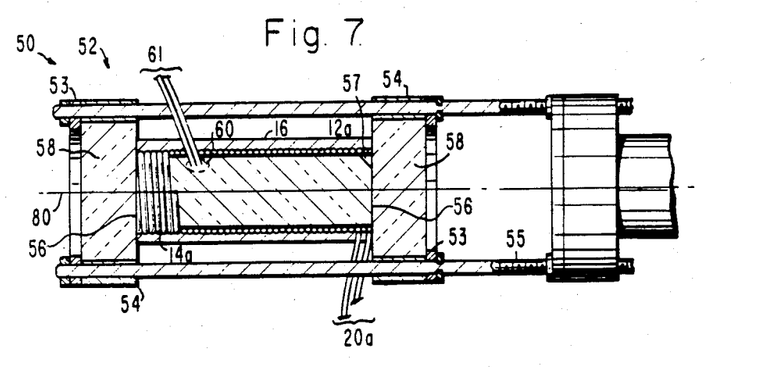
FIG. 7 is a transverse cross-sectional view of one of the assemblies shown in FIG. 6 taken along line 7—7.

The sapphire discs 58 are very good thermal conductors and draw heat out from the rods 12 transversely along axis 80. The heat from the cylindrical compensators is extracted through the faces 56 of the sapphire discs 58 which abut the ends of the rod. In order to prevent each rod 12A, 12B from slipping out of optical alignment, a bevelled portion 57 is formed at each end of each rod 12A, 12B as shown in FIG. 7. A small ring of adhesive 59 is deposited along each bevelled surface 57 to bond each rod 12A, 12B to a pair of sapphire discs 58.

The temperature of the cylindrical surface of each rod 12A, 12B is sensed by thermocouples 60 and 61. These thermocouples are embedded in the surface of each rod 12A, 12B below the layers formed by heat exchange means 14A, 14B and potting 16. Although the present invention utilizes imbedded thermocouples as temperature sensing means, many other techniques which are well known in the art may be employed to detect the heat at the cylindrical boundaries of the rods 12.

Figure 8:
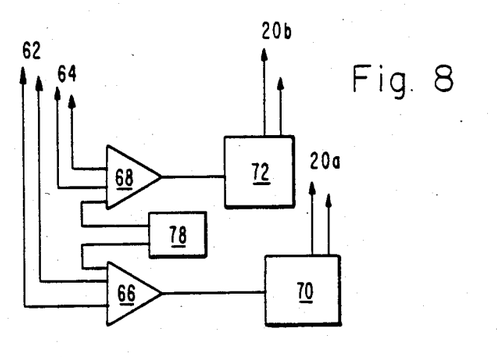
FIG. 8 is a schematic diagram of the temperature sensor and trigger means which coordinate the function of the tandem arrangement shown in FIG. 6.

Each thermocouple 60 and 61 has a pair of leads 62 and 64 which convey an electrical signal from each thermocouple junction. The signal generated at a thermocouple junction corresponds to the temperature at each junction. FIG. 8 shows leads 62 and 64 connected to a pair of control circuits 66 and 68. Each control circuit 66 and 68 is linked to sequencing circuit 78. The outputs from control circuits 66 and 68 are fed to heat exchange means power supplies 70 and 72. Power supplies 70 and 72 are connected to leads 20A and 20B which convey power to the respective heat exchange means 14A and 14B of assemblies 50 and 52.

Control circuits 66 and 68 and sequencing circuit 78 function in combination as a trigger means which coordinates the alternating action of rods 12A and 12B within twin assemblies 50 and 52. Sequencing circuit 78 senses the status of both control circuits 66, 68 and supplies a high-level switching signal to one of the control circuits and a low-level switching signal to the other control circuit at all times. When the sequencing circuit is toggled by a signal sent to it from one of the control circuits, the high and low switching signals are reversed. In other words, when the sequencing circuit 78 is toggled, the control circuit which had been receiving a high switching signal then receives a low switching signal and vice versa.

Thermocouples 60 and 61 develop voltages that are sent along leads 62 and 64 to the control circuits 66 and 68 which, in turn, amplify the signals and compare them to a stored reference value. If an input thermocouple voltage is equal to the reference value, sequencing circuit 78 is toggled and sends a low or zero signal back to the control circuit which made the comparison. This low signal causes the receiving control circuit to turn off its respective heat exchange means power supply 70 and 72. When a low signal is sent to one of the two control circuits 66 or 68, a high signal is simultaneously sent to the other control circuit, which then causes the power supply that is connected to it to send an electrical current to its heat exchange winding 14A or 14B.

When the present invention is initially energized, both thermocouples 60, 61 sense temperatures which are below the reference value. The reference value is a predetermined temperature which is programmed into a memory device within control circuits 66, 68 and represents the maximum operating temperature of the rods 12A, 12B. The control circuits each include an amplifier which processes the input voltages from the thermocouples, as well as an "and" gate or its equivalent which carries out the comparison between an input and the reference value. Only one of the two control circuits 66 and 68 receive a high switching signal from the sequencing circuit at any given time. The control circuit which receives the high switching signal triggers the power supply 70 or 72 to which it is connected.

For purposes of this explanation, it may be presumed that control circuit 66 receives the high switching signal and control circuit 68 receives the low switching signal when the present invention is turned on. Heat exchange means 14A then receives electrical current from power supply 70, and rod 12A within winding 14A heats up and commences its variable lensing and birefringence compensation action. At the outset of the operation of the pair of variable lens and birefringence compensators, only assembly 50 is activated, since sequencing circuit 78 sends a high switching signal to only one of the two assemblies 50, 52. When the cylindrical surface of rod 12A reaches the reference value, control circuit 66 sends a signal to sequencing circuit 78 which toggles the sequencing circuit. Control circuit 66 then receives a low switching signal which causes control circuit 66 to turn off power supply 70. Leads 20A then cease supplying winding 14A with electrical current. Rod 12A then begins to cool, since its source of heat has been turned off. Rod 12B simultaneously begins to heat up, since winding 14B is energized when sequencing circuit 78 toggles and control circuit 68 activates power supply 72.

When rod 12B reaches its maximum operating temperature, control circuit 68 senses that condition and toggles sequencing circuit 78 once more to begin the cycle again. This cycle continues as each rod takes over the variable lensing and birfringence compensation tasks in turn. The alternation of the duty cycles of the rods 12A and 12B enables the present invention to operate continuously. Minor modifications to the control and sequencing circuits can refine the timing of the switching between the two assemblies 50 and 52 in order to assure a smooth transition between the action of each member of the pair. For example, the cooperation of the pair is enhanced if the rod which is inactive begins heating slowly as the active rod approaches the maximum temperature. The control circuits, sequencing circuit, and power supplies are constructed from conventional, off-the-shelf components. The designs and operation of the circuits described above are well known to persons of ordinary skill in the electronics art.

Figure 9:
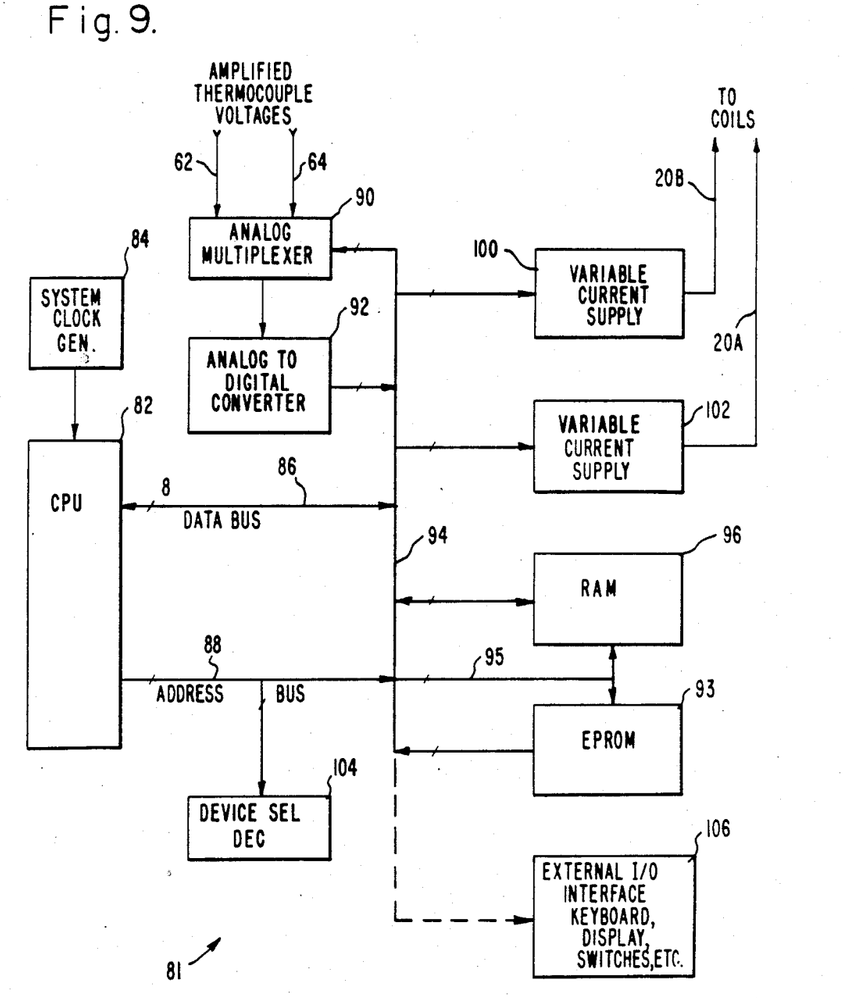
FIG. 9 is a schematic diagram of an alternative embodiment of the trigger means shown in FIG. 8.

FIG. 9 further discloses means by which the action of the tandem assemblies 50 and 52 can be coordinated. The control mechanism described above can be substantially incorporated on a single integrated circuit chip. This alternative embodiment of trigger means 66, 68; sequencing circuit 78; and power supplies 70, 72 is depicted schematically as an integrated circuit 81.

A central processing unit or CPU 82 is shown connected by data bus 86 and address bus 88 to main bus 94 and a plurality of integrated devices by circuit pathways 95. The CPU is a common commercially available device which is referred to in the electronics field as a 6502 CPU. CPU 82 is connected to a system clock generator 84 which develops a regulating series of pulses for the CPU. Signals from thermocouples 60 and 61 are introduced to the integrated circuit 81 through connectors 62 and 64 into an analog multiplexer 90. The multiplexer 90 identifies and segregates the two different signals by sampling the analog voltages at 62 and 64 only at regular, predetermined intervals which are defined by system clock generator 84. An analog to digital converter 92 converts the analog voltages at 62 and 64 which are produced at the thermocouple junctions into digital values.

These digital values are stored by the CPU 82 in an erasable, programmable memory or EPROM 98. The address in the EPROM 98 at which any particular digital value is stored is selected by the device select decoder 104, which works in cooperation with the CPU 82 and enables the CPU to keep track of where information is stored. Once a digital value which represents a thermocouple temperature is stored in the EPROM 98, the CPU compares it to another digital value stored in the EPROM which represents the maximum operational temperature of the rods 12A, 12B within the tandem assemblies 50, 52. This process of comparison is repeated many times each second until the CPU senses a condition of equivalence between an input from one of the thermocouples and the pre-programmed value stored in the EPROM. Once the CPU determines that either of the rods 12A, 12B has equaled or exceeded the limit, the CPU sends a signal to the device select decoder 104. The decoder 104 then provides the CPU with an address in random access memory or RAM 96 which contains information that instructs the CPU to alter the supply of power to coils 14A and 14B in order to correct the overheating condition. Power for the coils 14A, 14B is supplied by variable current supplies 100, 102 which are connected to main bus 94 and winding leads 20A, 20B. RAM 96 contains information which is read and used by the CPU to switch off the overheating rod 12A or 12B slowly while switching on the other rod immediately in order to ensure a smooth transistion of variable lensing and birefringent compensation action. This cycle of switching the assemblies 50 and 52 on and off continues sequentially as described above to enable the present invention to operate continuously. An external input/output interface 106 which includes a keyboard, a display, and various switches may be coupled to main bus 94 as a permanent fixture or as a temporary adjustment means for controlling the operation of the integrated circuit or for reprogramming and resetting purposes.

All of the devices described above that are shown in FIG. 9 are conventional circuit elements which are commonly employed in these types of designs by persons ordinarily skilled in the electronics arts.

Figure 10:
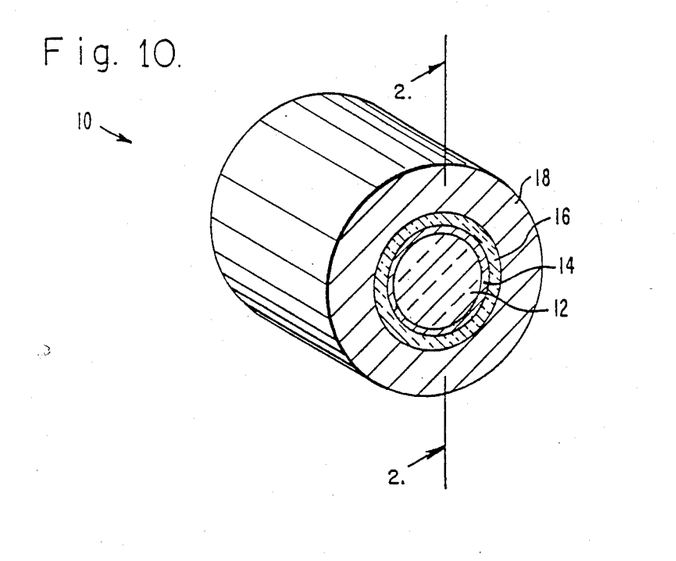
FIG. 10 is a perspective view of a portion of an alternative embodiment of the present invention.

FIGS. 9 and 10 show an alternative embodiment of the single-rod variable lens and birefringence compensator 10 which forms part of the present invention. In the alternative embodiment pictured, the heat transfer means 14 takes the particular form of a sleeve of electrically conductive material surrounding the optical body 12, with electrical leads 20 attached to opposite ends of the sleeve.

Figure 11:
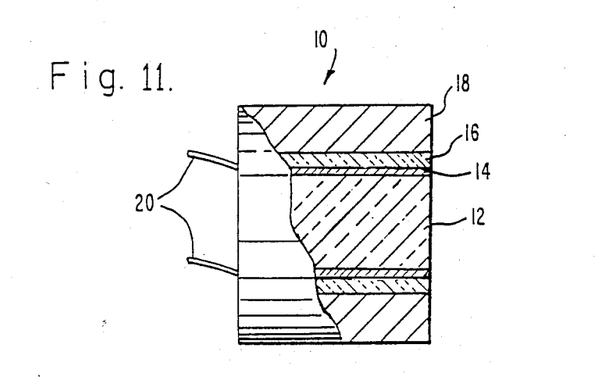
FIG. 11 is an elevational, partial cutaway view of a portion of an alternative embodiment of the present invention, taken along line 2—2 of FIG. 10.
Figure 12:
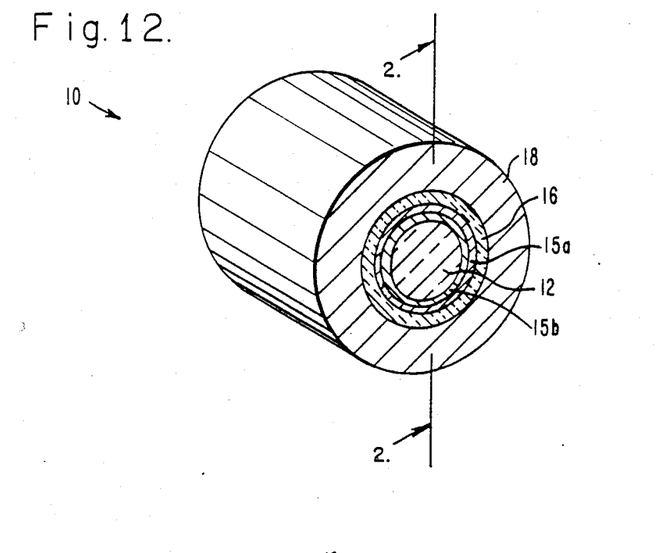
FIG. 12 is a perspective view of a portion of another alternative embodiment of the present invention.
Figure 13:
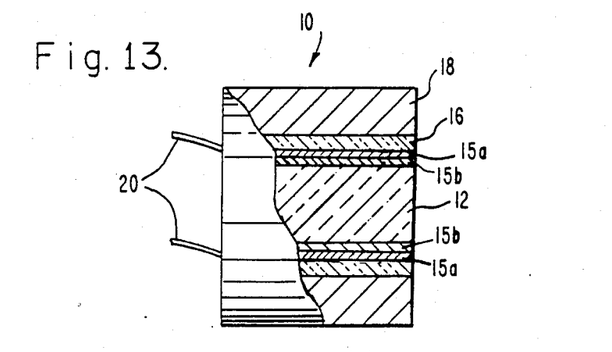
FIG. 13 is an elevational, partial cutaway view of a portion of another alternative embodiment of the present invention, taken along line 2—2 of FIG. 12.

FIGS. 11 and 12 depict another alternative embodiment of the single-rod variable lens and birefringence compensator 10 which forms part of the present invention. In this alternative embodiment the heat transfer means comprises adjacent concentric layers of Peltier junction material 15a,b surrounding the optical body 12, with electrical leads 20 attached to the separate layers that constitute the junction. Depending on the polarity of the electric potential difference applied to the Peltier junction, heat is either liberated or absorbed at the junction.

Although the present invention has been described in detail with reference to a particular preferred embodiment, persons having ordinary skill in the art will appreciate that various modifications and alterations may be made without departing from the spirit and scope of the invention.

What is claimed is:

1. Continuous operation variable lens and birefringence compensation apparatus comprising:
   a plurality of coaxial, substantially cylindrical optically aligned bodies of optical material;
   each of said bodies of optical material having temperature dependent indices of refraction;
   each of said bodies having its own separate external, thermally coupled heat exchange means for producing a set of independent, adjustable, nonlinear radial thermal gradients within each of said bodies in order to control the optical characteristics of each of said bodies;
   each of said bodies having heat removal means;
   each of said bodies having heat insulation means for limiting the transport of heat from each of said bodies to its surrounding environment from regions of said bodies other than those regions enclosed by said heat removal means;
   wherein each of said bodies is coupled to temperature sensing means for determining the temperature of the surface of each of said bodies; and
   wherein each of said temperature sensing means is coupled to a trigger means for supplying power to each heat exchange means coupled to each of said bodies.

2. Apparatus as claimed in claim 1, in which said heat exchange means comprises a coil of metal wire wound around the exterior surface of each of said bodies of optical material; said wire transmitting heat to each of said bodies when electrical energy is applied to said coil.

3. Apparatus as claimed in claim 1, in which said heat exchange means comprises a sleeve of electrically conductive material placed in communication with each of said bodies of optical material.

4. Apparatus as claimed in claim 1, in which said heat exchange means comprises Peltier junction material placed around the exterior surface of each of said bodies of optical material; in which said Peltier junction material changes the temperature of each of said bodies of optical material when an electrical current is passed through said Peltier junction material.

5. Apparatus as claimed in claim 1, in which said optical material is selected from the following group consisting of glass, plastic, and crystal.

6. Apparatus as claimed in claim 1 in which said optical material has a predetermined coefficient of expansion such that said material expands when said material's temperature increases for creating an adjustable radial stress gradient within each of said bodies to control the optical characteristics of each of said bodies.

7. Apparatus as claimed in claim 1 in which said heat exchange means comprises a deposit of electrically conductive material placed around the exterior surface of each of said bodies of optical material.

8. Continuous operation variable lens and birefringence compensation apparatus comprising:
   a pair of coaxial, optically aligned bodies of optical material each having a cylindrical surface and each having first and second end surfaces;
   each of said bodies of optical material having temperature dependent indices of refraction;
   each of said bodies having its own separate heat exchange means for producing a coordinated set of independent, adjustable, nonlinear radial thermal gradients within each of said bodies in order to control the optical characteristics of each of said bodies;
   each of said bodies having end-surface mounted heat removal means;
   each of said bodies having heat insulation means for limiting the transport of heat from each of said bodies to its surrounding environment from said cylindrical surfaces;
   wherein each of said bodies is coupled to temperature sensing means for determining the temperature of the surface of each of said bodies; and
   wherein each of said temperature sensing means is coupled to a trigger means for supplying power to each heat exchange means coupled to each of said bodies.

9. Apparatus as claimed in claim 8, in which said optical material is selected from the following group consisting of glass, plastic, and crystal.

10. Apparatus as claimed in claim 8 in which said optical material has a predetermined coefficient of expansion such that said material expands when said material's temperature increases for creating an adjustable radial stress gradient within each of said bodies to control the optical characteristics of each of said bodies.

11. Apparatus as claimed in claim 8 in which said heat exchange means comprises a deposit of electrically conductive material placed around the exterior surface of each of said bodies of optical material.

12. Apparatus as claimed in claim 8, which said heat exchange means comprises a coil of metal wire wound around the exterior surface of each of said bodies of optical material; said wire transmitting heat to each of said bodies when electrical energy is applied to said coil.

13. Apparatus as claimed in claim 8, in which said heat exchange means comprises a sleeve of electrically conductive material placed in communcation with each of said bodies of optical material.

14. Apparatus as claimed in claim 8, in which said heat exchange means comprises Peltier junction material placed around the exterior surface of each of said bodies of optical material; in which said Peltier junction material changes the temperatures of each of said bodies of optical material when an electrical current is passed through said Peltier junction material.

15. Apparatus as claimed in claim 8, in which said end-surface mounted heat removal means comprises:
at least one substantially annular heat dissipating member composed of a material which is a good conductor of heat; and
in which at least one of said members is coupled to at least one of said end surfaces of each of said bodies of optical material.

16. Apparatus as claimed in claim 15 in which said substantially annular heat dissipating member is made of aluminum oxide.

17. Apparatus as claimed in claim 8 in which said end-surface mounted heat removal means comprises:
a pair of inner, substantially cylindrical heat dissipating layers composed of aluminum oxide;
in which each of said inner layers has an exterior circumferential surface;
a pair of outer, generally cylindrical heat dissipating layers composed of aluminum;
in which each of,said inner layers substantially encloses both of said end surfaces of each of said bodies of optics material; and
in which each of said outer layers is coupled to said circumferential surface of one of said inner layers.

18. Apparatus as claimed in claim 8 in which said temperature sensing means comprises:
a plurality of thermocouples;
wherein every individual body of optical material is coupled to at least one of said plurality of thermocouples, generally at the exterior surface of said body of optical material.

19. Apparatus as claimed in claim 8 in which said trigger means comprises:
first and second comparator means;
wherein each comparator means is coupled to a temperature sensing means and a heat exchange means which is coupled to one of said bodies of optical material;
in which each comparator means compares a reference temperature value to an input received from its respective temperature sensing means to which it is coupled;
in which said first and second comparator means are coupled by linking means so that they alternately switch their respective heat exchange means on sequentially;
in which each comparator means switches its respective heat exchange means off when the temperature of its said respective temperature sensing means is equal to said reference temperature.

20. Apparatus as claimed in claim 8 in which said trigger means comprises an integrated circuit for coordinating and controlling the operation of said continuous operation variable lens and birefringence compensation apparatus.

* * * * *